(12) United States Patent
Tomoguchi et al.

(10) Patent No.: US 8,824,047 B2
(45) Date of Patent: Sep. 2, 2014

(54) POLARIZING PLATE, OPTICAL FILM AND IMAGE DISPLAY

(75) Inventors: Naoki Tomoguchi, Ibaraki (JP); Youichirou Sugino, Ibaraki (JP); Nobuaki Iwamoto, Ibaraki (JP); Megumi Katou, Ibaraki (JP)

(73) Assignees: Nitto Denko Corporation, Ibaraki-shi (JP); Nippon Shokubai Co., Ltd, Osaka-shi (JP)

( * ) Notice: Subject to any disclaimer, the term of this patent is extended or adjusted under 35 U.S.C. 154(b) by 681 days.

(21) Appl. No.: 12/682,607

(22) PCT Filed: Oct. 21, 2008

(86) PCT No.: PCT/JP2008/069042
§ 371 (c)(1),
(2), (4) Date: Apr. 12, 2010

(87) PCT Pub. No.: WO2009/054376
PCT Pub. Date: Apr. 30, 2009

(65) Prior Publication Data
US 2010/0220392 A1    Sep. 2, 2010

(30) Foreign Application Priority Data
Oct. 24, 2007  (JP) .................. 2007-276469

(51) Int. Cl.
*G02B 5/30* (2006.01)
*G02F 1/1335* (2006.01)
*G02B 1/10* (2006.01)

(52) U.S. Cl.
CPC .............. *G02B 5/3033* (2013.01); *G02B 1/105* (2013.01)
USPC ................ 359/487.01; 359/487.02; 428/323; 349/96; 349/122

(58) Field of Classification Search
USPC ........... 359/487.01, 487.06, 487.02; 428/323; 349/96, 122
See application file for complete search history.

(56) References Cited

U.S. PATENT DOCUMENTS 7,749,578 B2 * 7/2010 Oka et al. ..................... 428/1.33
7,911,564 B2 * 3/2011 Nakano et al. .................. 349/96
(Continued)

FOREIGN PATENT DOCUMENTS

EP        1911777 A1      4/2008
JP     10-166519 A        6/1998
(Continued)

OTHER PUBLICATIONS

Notification of Transmittal of Translation of the International Preliminary Report on Patentability (Form PCT/IB/338) of International Application No. PCT/JP2008/069042 mailed Jun. 10, 2010 with Forms PCT/IB/373 and PCT/ISA/237.

(Continued)

*Primary Examiner* — Ricky D Shafer
(74) *Attorney, Agent, or Firm* — Westerman, Hattori, Daniels & Adrian, LLP

(57) ABSTRACT

A polarizing plate of the present invention includes a polyvinyl alcohol-based polarizer and transparent protective films provided on both sides of the polarizer with an adhesive layer interposed between the polarizer and each transparent protective film, wherein the transparent protective films each comprise a lactone ring structure-containing (meth)acrylic resin, each one of the transparent protective films has a thickness T1 ($\mu m$) of 10 to 35 $\mu m$, and the polarizer has a thickness T2 ($\mu m$) which satisfies that the ratio (T2/T1) of T2 to the thickness T1 of each one of the transparent protective films falls within the range of 0.8 to 1.8. The polarizing plate is designed to be thin and can satisfy durability.

8 Claims, 1 Drawing Sheet

(56) References Cited

U.S. PATENT DOCUMENTS

| | | | |
|---|---|---|---|
| 2005/0186441 A1* | 8/2005 | Hayashi et al. | 428/523 |
| 2007/0269616 A1* | 11/2007 | Nakano et al. | 428/1.31 |
| 2008/0123189 A1* | 5/2008 | Ikeda et al. | 359/485 |
| 2008/0143928 A1 | 6/2008 | Fukagawa | |
| 2009/0059369 A1* | 3/2009 | Otome et al. | 359/500 |
| 2009/0067047 A1* | 3/2009 | Ueda et al. | 359/485 |
| 2009/0153965 A1* | 6/2009 | Ito et al. | 359/500 |
| 2009/0202822 A1* | 8/2009 | Hasegawa et al. | 428/339 |
| 2010/0020396 A1* | 1/2010 | Izumi et al. | 359/485 |
| 2010/0232018 A1* | 9/2010 | Kobayashi et al. | 359/493 |
| 2010/0253884 A1* | 10/2010 | Katou et al. | 349/96 |

FOREIGN PATENT DOCUMENTS

| | | | |
|---|---|---|---|
| JP | 2000-230016 A | 8/2000 | |
| JP | 2001-15814 A | 1/2001 | |
| JP | 2001-100032 A | 4/2001 | |
| JP | 2002-120326 A | 4/2002 | |
| JP | 2004-168882 A | 6/2004 | |
| JP | 2005-128294 A | 5/2005 | |
| JP | 2005-146084 A | 6/2005 | |
| JP | 2006-17464 A | 1/2006 | |
| JP | 2007-025008 A | 2/2007 | |
| JP | 2007-63541 A | 3/2007 | |
| JP | 2007-140092 A | 6/2007 | |
| JP | 2008-20890 A | 1/2008 | |
| JP | 2002-254544 A | 4/2010 | |
| TW | 2006-36306 | 10/2006 | |
| TW | I282028 B | 6/2007 | |
| WO | 03/076985 A1 | 9/2003 | |
| WO | WO2006/112223 | * | 10/2006 |
| WO | 2007/015512 A1 | 2/2007 | |
| WO | 2007/058115 A1 | 5/2007 | |
| WO | 2007/145081 A1 | 12/2007 | |

OTHER PUBLICATIONS

Chinese Office Action dated Jun. 23, 2011, issued in corresponding Chinese Patent Application No. 200880112815.1.
Korean Decision for Grant of Patent dated Apr. 30, 2012 issued in corresponding Korean Patent Application No. 2010-7010035, (3 pages). W/ Partial Translation.
Machine Translation only of JP2004-168882 previously submitted on Apr. 9, 2010, (8 pages). Korean Decision for Grant of Patent dated Apr. 30, 2012.
Korean Office Action dated Sep. 21, 2011, issued in corresponding Korean Patent Application No. 10-2010-7010035.
International Search Report of PCT/JP2008/069042, mailing date of Jan. 27, 2009.
Taiwanese Office Action dated Dec. 17, 2012, issued in corresponding Taiwanese patent application No. 097141075, w/ English translation.
Japanese Office Action dated Nov. 30, 2012, issued in corresponding Japanese Patent Application No. 2008-270891, with English translation (5 pages).

* cited by examiner

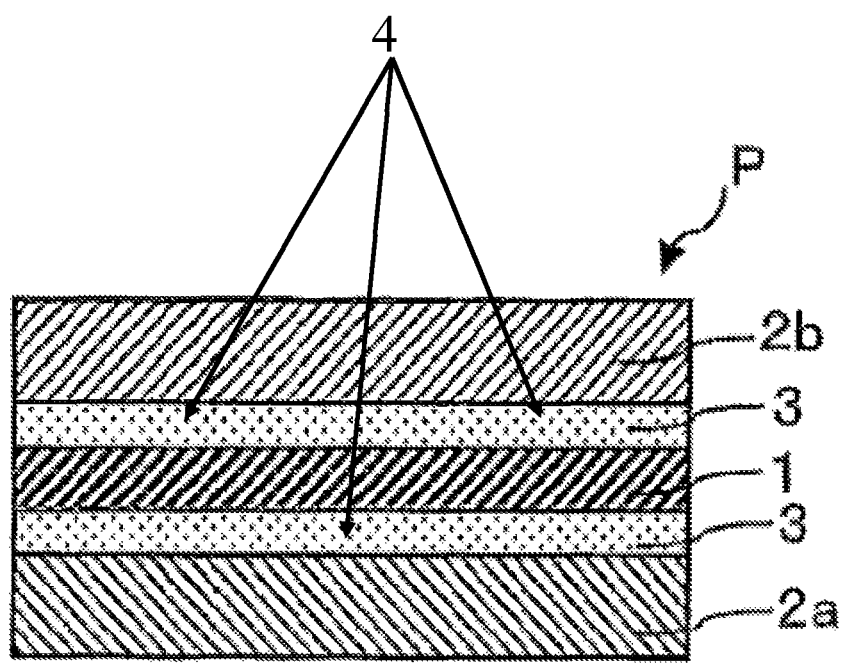

POLARIZING PLATE, OPTICAL FILM AND IMAGE DISPLAY

TECHNICAL FIELD

The present invention relates to a polarizing plate. The polarizing plate may be used alone or as a part of a laminated optical film to form liquid crystal displays (LCDs), organic EL displays, CRTs, PDPs, and so on.

BACKGROUND ART

Liquid crystal displays use liquid crystal switching to visualize the polarization state, and based on the display principle, they use a polarizing plate including a polarizer and transparent protective films provided on both sides of the polarizer with an adhesive layer interposed therebetween. For example, iodine polarizers made of stretched polyvinyl alcohol to which iodine is adsorbed have high transmittance and high degree of polarization. Therefore, they are most popular polarizers widely used. Triacetylcellulose or the like has high water-vapor permeability and therefore is used for transparent protective films.

Image displays such as liquid crystal displays as an application of the polarizing plate are used under various environments. Therefore, it is demanded that the polarizing plate should have durability such as heat resistance under high temperature environment or humidity resistance under high humidity environment. In recent years, image displays have been required to be thin particularly in mobile applications such as cellular phones, and therefore, polarizing plates have also been required to be thin. However, as polarizing plates are reduced in thickness, it becomes difficult to satisfy durability requirements.

The transparent protective film used in a polarizing plate is bonded to the polarizer with an adhesive. Therefore, the process of preparing a polarizing plate has a problem in which knick defects may occur when the polarizer and the transparent protective film are bonded together. Knick defects are defects of local irregularities formed at the interface between the polarizer and the transparent protective film. Against such knick defects, there is proposed a method that includes using, as a polarizer, a polyvinyl alcohol-based film with a controlled water content and with its surface treated with a calendar roll under specific conditions, and laminating the film and a transparent protective film (Patent Literature 1). Knick defects are particularly easy to occur when a polyvinyl alcohol-based resin having an acetoacetyl group is used for the polyvinyl alcohol-based adhesive.

Patent Literature 1: JP-A No. 10-166519

DISCLOSURE OF INVENTION

Problems to be Solved by the Present Invention

An object of the invention is to provide a polarizing plate that is designed to be thin and has satisfactory durability.

It is another object of the present invention to provide an optical film in which a polarizing plate is laminated and to provide an image display, such as a liquid crystal display, using such a polarizing plate or such an optical film.

Means for Solving the Problems

The inventors have conducted serious studies in order to solve the above tasks with findings that the objects can be achieved with a polarizing plate shown below, having led to completion of the present invention.

The present invention relates to a polarizing plate, comprising a polyvinyl alcohol-based polarizer and transparent protective films provided on both sides of the polarizer with an adhesive layer interposed between the polarizer and each transparent protective film, wherein the transparent protective films each comprise a lactone ring structure-containing (meth)acrylic resin, each one of the transparent protective films has a thickness T1 (μm) of 10 to 35 μm, and the polarizer has a thickness T2 (μm) which satisfies that the ratio (T2/T1) of T2 to the thickness T1 of each one of the transparent protective films falls within the range of 0.8 to 1.8.

In the polarizing plate, the adhesive layers can be formed from an adhesive for polarizing plate including a resin solution, wherein the resin solution includes a polyvinyl alcohol-based resin, a crosslinking agent and a colloidal metal compound with an average particle size of 1 nm to 100 nm, wherein 200 parts by weight or less of the colloidal metal compound is added to 100 parts by weight of the polyvinyl alcohol-based resin.

In the polarizing plate, as the colloidal metal compound, at least one selected from the group consisting of colloidal alumina, colloidal silica, colloidal zirconia, colloidal titania, and colloidal tin oxide, is preferably used. And the colloidal metal compound preferably has a positive charge, particularly; colloidal alumina.

In the polarizing plate, the transparent protective films preferably each have a water-vapor permeability of 250 g/m² or less.

The present invention also relates to an optical film, including a laminate including at least one piece of the polarizing plate.

The present invention also relates to an image display, including the polarizing plate or the optical film.

Effects of the Invention

In the polarizing plate of the invention, each one of the transparent protective films has a thickness T1 (μm) of 10 to 35 μm, and the polarizer has a thickness T2 (μm) which satisfies that the ratio (T2/T1) of T2 to the thickness T1 of the transparent protective film falls within the range of 0.8 to 1.8. Therefore, the polarizing plate of the invention is designed to be thin, because the thicknesses of the transparent protective films and the polarizer are selected to be small.

In an embodiment of the present invention, a transparent protective film containing a lactone ring structure-containing (meth)acrylic resin is used in the polarizing plate. The lactone ring structure-containing (meth)acrylic resin has a low water-vapor permeability and can satisfy durability requirements such as heat resistance under high temperature environment and humidity resistance under high humidity environment even when used to form a thin polarizing plate.

In an embodiment of the present invention, a polyvinyl alcohol-based adhesive containing a colloidal metal compound with an average particle size of 1 to 100 nm may be used to form an adhesive layer for bonding the polarizer and the transparent protective film together. In this case, the colloidal metal compound acts to suppress the generation of knick defects. Therefore, the yield of the preparation of the polarizing plate and the productivity of the polarizing plate are improved, so that a liquid crystal panel can be manufactured with improved productivity.

The colloidal metal compound preferably has a positive charge. The colloidal metal compound with a positive charge is more effective in suppressing the generation of knick defects than the colloidal metal compound with a negative charge. In particular, the colloidal metal compound with a positive charge is preferably an alumina colloid.

A polyvinyl alcohol-based resin may be used for an adhesive for polarizing plate to form the adhesive layer. In a particularly preferred embodiment of the present invention, a polyvinyl alcohol-based resin having an acetoacetyl group is used as the polyvinyl alcohol-based resin. The adhesive using the polyvinyl alcohol-based resin having an acetoacetyl group can form an adhesive layer with good water resistance. On the other hand, when a polyvinyl alcohol-based resin having an acetoacetyl group is used in conventional adhesive for polarizing plate, the occurrence of knick defects is frequently observed. However, the adhesive for polarizing plate of the present invention includes the colloidal metal compound and thus can reduce the occurrence of knick defects even when a polyvinyl alcohol-based resin having an acetoacetyl group is used in the adhesive for polarizing plate. Thus, there is provided an adhesive for polarizing plate having water resistance and capable of reducing the occurrence of knick defects.

BEST MODE FOR CARRYING OUT THE PRESENT INVENTION

The polarizing plate of the present invention is described below and illustrated in FIG. 1. In FIG. 1, reference number 1 represents a polarizer, 2a a transparent protective film (retardation plate), 2b another transparent protective film, 3 an adhesive layer, 4 colloidal metal compound particles, and P a polarizing plate. The polarizing plate of the present invention includes a polyvinyl alcohol-based polarizer 1 and transparent protective films 2a and 2b provided on both sides of the polarizer with an adhesive layer 3 interposed between the polarizer 1 and each transparent protective film 2a or 2b. The adhesive layer contains a colloidal metal compound particles 4.

The polyvinyl alcohol-based polarizer to be used may be a uniaxially-stretched polyvinyl alcohol-based resin film dyed with a dichroic material (typically, iodine or a dichroic dye). The polyvinyl alcohol-based resin of the polyvinyl alcohol-based resin film preferably has a degree of polymerization of 100 to 10,000, more preferably 1,000 to 5,000. If the degree of polymerization is too low, the film may easily break during a certain stretching process. If the degree of polarization is too high, an high tension may be necessary for stretching, so that mechanical stretching may be impossible.

The polyvinyl alcohol-based resin film used to form the polarizer may be formed by any appropriate method (such as a solution casting method including casting a solution of the resin in water or an organic solvent to form a film, a casting method, or an extrusion method). The thickness of the polarizer is generally from 5 to 63 μm, preferably from 10 to 50 μm, more preferably from 20 to 40 μm, while it may be appropriately selected depending on the purpose or use of the LCD to be formed using the polarizing plate.

Any appropriate method depending on the purpose, the materials to be used, the conditions, and so on may be used as a method for manufacturing the polarizer. For example, a method that may be used includes subjecting the polyvinyl alcohol-based resin film to a series of producing processes generally including swelling, dyeing, crosslinking, stretching, washing with water, and drying. In a producing method of a polarizer of the present invention, the above processes were applied. Except for the drying process, each process may be performed while the polyvinyl alcohol-based resin film is immersed in a bath containing a solution necessary for each process. Concerning the processes of swelling, dyeing, crosslinking, stretching, washing with water, and drying, the order of the processes, the number of times of each process, or the presence or absence of each processes may be appropriately determined depending on the purpose, the materials to be used and the conditions. For example, some treatments may be simultaneously performed in a single process, and swelling treatment, dyeing treatment and crosslinking treatment may be performed at the same time. For example, crosslinking treatment before or after stretching treatment is preferably employed. For example, washing treatment with water may be performed after all of the other treatment or only after a certain treatment.

The swelling treatment process is typically performed by immersing the polyvinyl alcohol-based resin film in a treatment bath containing water. By this treatment, the surface of the polyvinyl alcohol-based resin film is cleaned of dirt and an anti-blocking agent, and the polyvinyl alcohol-based resin film is allowed to swell so that unevenness such as uneven dyeing can be prevented. Glycerin, potassium iodide and so on may be added, as appropriate, to the swelling bath. The temperature of the swelling bath is generally from about 10 to about 60° C., and the time of immersion in the swelling bath is generally from about 0.1 to about 10 minutes.

The dyeing treatment process is typically performed by immersing the polyvinyl alcohol-based resin film in a treatment bath containing a dichroic material such as iodine. Water is generally used as a solvent for the dyeing bath solution, to which a proper amount of an organic solvent compatible with water may be added. The dichroic material is generally used in an amount of 0.1 to 0.5 parts by weight, preferably of 0.02 to 0.4 parts by weight, based on 100 parts by weight of the solvent. When iodine is used as the dichroic material, the dyeing bath solution preferably contain an aid such as an iodide, so that the dyeing efficiency can be improved. The aid is preferably used in an amount of 0.01 to 10 parts by weight, more preferably of 0.02 to 8 parts by weight, based on 100 parts by weight of the solvent. Examples of the iodide include potassium iodide, lithium iodide, sodium iodide, zinc iodide, aluminum iodide, lead iodide, copper iodide, barium iodide, calcium iodide, tin iodide, and titanium iodide. The temperature of the dyeing bath is generally from about 10 to about 70° C., and the time of immersion in the dyeing bath is generally from about 1 to about 20 minutes.

The crosslinking treatment process is typically performed by immersing the dyed polyvinyl alcohol-based resin film in a treatment bath containing a crosslinking agent. Any appropriate crosslinking agent may be used. Examples of the crosslinking agent include boron compounds such as boric acid and borax, glyoxal, and glutaraldehyde. One or more of these crosslinking agents may be used alone or in combination. Water is generally used as a solvent for the crosslinking bath solution, to which a proper amount of an organic solvent compatible with water may be added. The crosslinking agent is generally used in an amount of 2 to 15 parts by weight, preferably of 3 to 10 parts by weight, based on 100 parts by weight of the solvent. If the content of the crosslinking agent is less than 1 part by weight, the resulting optical properties can be insufficient. If the content of the crosslinking agent is more than 15 parts by weight, large stress can be applied to the film during stretching so that the resulting polarizing plate could be shrunk. The crosslinking bath solution preferably contains an aid such as an iodide, so that uniform in-plane properties can be easily obtained. The concentration of the aid is preferably from 0.05 to 15% by weight, more preferably from 0.5 to 8% by weight. Examples of the iodide may be the same as in the case of the dyeing treatment process. The temperature of the crosslinking bath is generally from about 20 to about 70° C., preferably from 40 to 60° C. The time of immersion in the crosslinking bath is generally from about 1 second to about 15 minutes, preferably from 5 seconds to 10 minutes. The stretching treatment process may be performed at any stage described above.

Specifically, the stretching treatment process may be performed before or after the dyeing treatment, performed simultaneously with a swelling treatment, the dyeing treatment, or a crosslinking treatment, or performed after the crosslinking treatment. The polyvinyl alcohol-based resin film is generally stretched to a total stretched ratio of 4 or more, preferably 4 to 8, more preferably 5 to 6.5. When the total stretch ratio is less than 4, it may be difficult to produce a polarizing plate with high degree of polarization. When the total stretch ratio is more than 8, the polyvinyl alcohol-based resin film may be more likely to rupture. Specifically, any appropriate method may be used. For example, when a wet stretching method is used, the polyvinyl alcohol-based resin film may be stretched to a desired ratio in a treatment bath. A solution prepared by adding a material to meet each treatment requirement, such as iodine, boron, or a metal salt such as a zinc salt, to a solvent such as water or an organic solvent (for example, ethanol) is preferably used for the stretching bath.

The process of washing with water is typically performed by immersing the polyvinyl alcohol-based resin film on which the above-described various treatments are carried out in a treatment bath. Unnecessary residues can be washed away from the polyvinyl alcohol-based resin film by the process of washing with water. The water-washing bath may be of pure water or an aqueous solution of an iodide such as potassium iodide and sodium iodide. The aqueous iodide solution preferably has a concentration of 0.1 to 10% by weight. An aid such as zinc sulfate and zinc chloride may be added to the aqueous iodide solution. The temperature of the water-washing bath is preferably from 10 to 60° C., more preferably from 30 to 40° C. The immersion time may be from 1 second to 1 minute. The process of washing with water may be performed only once or twice or more, if necessary. When the process of washing with water is performed twice or more, the type and concentration of the additive contained in the water-washing bath for each treatment may be controlled as appropriate. For example, the process of washing with water may include immersing the polyvinyl alcohol-based resin film in an aqueous potassium iodide solution (0.1 to 10% by weight, 10 to 60° C.) for 1 second to 1 minute after any of the above treatments and rinsing the film with pure water. In the process of washing with water, an organic solvent compatible with water (such as ethanol) may be added as appropriate in order to modify the surface of the polarizer or increase the efficiency of drying of the polarizer.

Any appropriate methods such as natural drying, blow drying, and drying by heating may be used in the drying process. In the case of drying by heating, for example, the drying temperature is generally from about 20 to about 150° C., preferably from 40 to 100° C., and the drying time is generally from about 1 to about 10 minutes. The polarizer may be obtained as described above.

The polarizer for use in an embodiment of the invention preferably has a moisture content of 15% by weight or less, more preferably 0 to 14% by weight, even more preferably 1 to 14% by weight. If the moisture content is higher than 15% by weight, the resulting polarizing plate may suffer from significant dimensional changes, so that the problem of significant dimensional changes may occur under high temperature or high temperature and high humidity.

In an embodiment of the invention, the moisture content of the polarizer may be controlled by any appropriate method. For example, a method for the control may include controlling the drying process conditions in the process of manufacturing the polarizer.

The moisture content of the polarizer may be measured by the method described below. Specifically, the polarizer was cut into a sample piece with a size of 100×100 mm, and the initial weight of the sample was measured. The sample was then dried at 120° C. for 2 hours, and the dry weight was measured. The moisture content was determined by the following formula: moisture content (% by weight)={(initial weight−dry weight)/initial weight}×100. Each weight was measured three times, and the average was used.

The thickness (T2) of the polarizer is generally, but not limited to, from 5 to 63 μm, preferably from 10 to 50 μm, more preferably from 20 to 40 μm.

The transparent protective films used on both sides of the polyvinyl alcohol-based polarizer each contain a lactone ring structure-containing (meth)acrylic resin.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, 2005-146084 and 2006-171464.

The lactone ring structure-containing (meth)acrylic reins preferably have a ring structure represented by Formula (I):

[Formula 1]

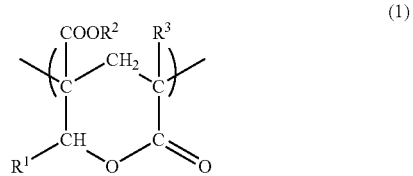

(1)

In the formula, $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor. The content of the lactone ring structure in the lactone ring structure-containing (meth) acrylic resin may be determined by gas chromatography and dynamic TG measurement, for example, as The lactone ring structure-containing (meth)acrylic resin may also have a structure other than the lactone ring structure represented by formula (1). The structure other than the lactone ring structure represented by formula (1) is preferably, but not limited to, a structural unit (repeating structural unit) of a polymer formed by polymerization of at least one selected from a (meth)acrylic ester, a hydroxyl group-containing monomer, an unsaturated carboxylic acid, and a monomer represented by formula (2) below, as described below for methods for producing the lactone ring structure-containing (meth)acrylic resin.

[Formula 2]

(2)

In the formula, $R^4$ represents a hydrogen atom or a methyl group, X represents a hydrogen atom, an alkyl group of 1 to 20 carbon atoms, an aryl group, an —OAc group, a —CN group, or a —CO—$R^5$ group, wherein Ac group represents an acetyl group, and $R^5$ represents a hydrogen atom or an organic residue of 1 to 20 carbon atoms.

The content of the structure other than the lactone ring structure represented by formula (1) in the lactone ring structure-containing (meth)acrylic resin is preferably from 10 to 95% by weight, more preferably from 10 to 90% by weight, even more preferably from 40 to 90% by weight, in particular preferably 50 to 90% by weight, when the structure is a structural unit (repeating structural unit) of a polymer formed by polymerization of a (meth)acrylic ester, preferably from 0 to 30% by weight, more preferably from 0 to 20% by weight, even more preferably from 0 to 15% by weight, in particular preferably 0 to 10% by weight, when the structure is a structural unit (repeating structural unit) of a polymer formed by polymerization of a hydroxyl group-containing monomer, preferably from 0 to 30% by weight, more preferably from 0 to 20% by weight, even more preferably from 0 to 15% by weight, in particular preferably 0 to 10% by weight. When the structure is a structural unit (repeating structural unit) of a polymer formed by polymerization of an unsaturated carboxylic acid, preferably from 0 to 30% by weight, more preferably from 0 to 20% by weight, even more preferably from 0 to 15% by weight, in particular preferably 0 to 10% by weight. When the structure is a structural unit (repeating structural unit) of a polymer formed by polymerization of the monomer represented by formula (2), preferably from 0 to 30% by weight, more preferably from 0 to 20% by weight, even more preferably from 0 to 15% by weight, in particular preferably 0 to 10% by weight.

Methods for producing the lactone ring structure-containing (meth)acrylic resin preferably include, but are not limited to, performing a polymerization process to obtain an acrylic polymer (a) having a hydroxyl group and an ester group in the molecule chain and then performing a lactone ring-forming condensation process in which the resulting acrylic polymer (a) is heat-treated so that a lactone ring structure is introduced into the polymer.

In the polymerization process, the polymerization reaction of a monomer component including a monomer represented by formula (3) below is performed, so that the acrylic polymer (a) having a hydroxyl group and an ester group in the molecular chain is obtained.

[Formula 3]

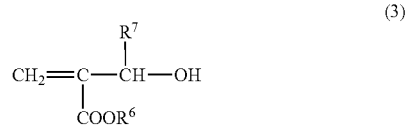

(3)

In the formula, $R^6$ and $R^7$ each independently represent a hydrogen atom or an organic residue of 1 to 20 carbon atoms. Examples of the monomer represented by formula (3) include methyl 2-(hydroxymethyl)acrylate, ethyl 2-(hydroxymethyl) acrylate, isopropyl 2-(hydroxymethyl)acrylate, n-butyl 2-(hydroxymethyl)acrylate, and tert-butyl 2-(hydroxymethyl)acrylate. Among these, methyl 2-(hydroxymethyl) acrylate or ethyl 2-(hydroxymethyl)acrylate is preferred, and methyl 2-(hydroxymethyl)acrylate is particularly preferred, because it is highly effective in improving heat resistance. A single or two or more monomers represented by formula (3) may be used alone or in combination.

The monomer components to be subjected to the polymerization process may include an additional monomer other than the monomer represented by formula (3). Preferred examples of such an additional monomer include a (meth) acrylic ester, a hydroxyl group-containing monomer, an unsaturated carboxylic acid, and the monomer represented by formula (2), as listed above. A single or two or more additional monomers other than the monomer represented by formula (3) may be used alone or in combination.

The (meth)acrylic ester may be of any type other than the monomer represented by formula (2). Examples of the (meth) acrylic ester include an acrylic ester such as methyl acrylate, ethyl acrylate, n-butyl acrylate, isobutyl acrylate, tert-butyl acrylate, cyclohexyl acrylate, or benzyl acrylate; and a methacrylic ester such as methyl methacrylate, ethyl methacrylate, propyl methacrylate, n-butyl methacrylate, isobutyl methacrylate, tert-butyl methacrylate, cyclohexyl methacrylate, or benzyl methacrylate. These may be used alone or in combination of two or more thereof. In particular, methyl methacrylate is preferred, because of its high heat resistance and transparency.

The hydroxyl group-containing monomer may be of any type other than the monomer represented by formula (2). Examples of the hydroxyl group-containing monomer include a 2-(hydroxyalkyl)acrylic ester such as a-hydroxymethylstyrene, α-hydroxyethylstyrene or methyl 2-(hydroxyethyl)acrylate; and 2-(hydroxyalkyl)acrylic acid such as 2-(hydroxyethyl)acrylic acid. These may be used alone or in combination of two or more thereof.

Examples of the unsaturated carboxylic acid include acrylic acid, methacrylic acid, crotonic acid, α-substituted acrylic acid, and α-substituted methacrylic acid. These may be used alone or in combination of two or more thereof. Among these, acrylic acid or methacrylic acid is particularly preferred in order to produce the effects of the present invention sufficiently.

Examples of the monomer represented by formula (2) include styrene, vinyltoluene, α-methylstyrene, acrylonitrile, methyl vinyl ketone, ethylene, propylene, and vinyl acetate. These may be used alone or in combination of two or more thereof. Among these, styrene or α-methylstyrene is particularly preferred in order to produce the effects of the present invention sufficiently.

In the process of the ring-forming condensation reaction, any other thermoplastic resin may be allowed to coexist with the acrylic polymer (a). If necessary, a ring-forming condensation reaction catalyst may be used in the ring-forming condensation reaction.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The mass average molecular weight was determined as a polystyrene-equivalent molecular weight using gel permeation chromatography (GPC System, manufactured by TOSOH CORPORATION). Tetrahydrofuran was used as a solvent.

The lactone ring structure-containing (meth)acrylic resin preferably has a Tg (glass transition point) of 115° C. or more, more preferably of 125° C. or more, still more preferably of 130° C. or more, particularly preferably of 135° C. or more, most preferably of 140° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin of the present invention, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

In an embodiment of the present invention, the transparent protective film may contain an additional thermoplastic resin in addition to the lactone ring structure-containing (meth)acrylic resin. The additional thermoplastic resin is preferably one that is thermodynamically compatible and capable of increasing the transparency or mechanical strength.

In an embodiment of the present invention, the content of the thermoplastic resin other than the lactone ring structure-containing (meth)acrylic resin in the transparent protective film should be 40% by weight or less. If the content of the thermoplastic resin other than the lactone ring structure-containing (meth)acrylic resin in the transparent protective film is more than 40% by weight, the effects of the present invention may be insufficiently produced. When the lactone ring structure-containing (meth)acrylic resin is mixed with the additional thermoplastic resin, the ratio of the former to the latter is preferably from 60%:40% by weight to 99%:1% by weight, more preferably from 70%:30% by weight to 97%:3% by weight, even more preferably from 80%:20% by weight to 95%:5% by weight.

Examples of the additional thermoplastic resin include an olefin-based polymer such as polyethylene, polypropylene, an ethylene-propylene copolymer, or poly(4-methyl-1-pentene); a halogen-containing polymer such as a vinyl chloride resin or a chlorinated vinyl resin; an acrylic polymer such as polymethyl methacrylate; a styrene-based polymer such as polystyrene, a styrene-methyl methacrylate copolymer, a styrene-acrylonitrile copolymer, or an acrylonitrile-butadiene-styrene block copolymer; polyester such as polyethylene terephthalate, polybutylene terephthalate or polyethylene naphthalate; polyamide such as nylon 6, nylon 66 or nylon 610; polyacetal; polycarbonate; polyphenylene oxide; polyphenylene sulfide; polyether ether ketone; polysulfone; polyether sulfone; polyoxybenzylene; polyamide imide; and a rubber polymer such as a polybutadiene rubber, a blend of acrylic rubber and ABS resin, or an ASA resin.

The thickness (T1) of the transparent protective film is from 10 to 35 μm, preferably from 20 to 30 μm. The thickness (T1) of the transparent protective film is selected so that the ratio (T2/T1) of the thickness (T2) of the polarizer to the transparent protective film can fall within the range of 0.8 to 1.8. The ratio (T2/T1) is preferably from 0.8 to 1.5. If the thickness (T2) of the transparent protective film is less than 10 μm or if the ratio (T2/T1) is more than 1.8, the durability such as the heat resistance or the humidity resistance will be insufficient so that it will be impossible to suppress the shrinkage of the polarizer, which causes the problem of cracking or the like, so that the market requirements cannot be satisfied. In this case, problems such as breaking and buckling also may easily occur in the resulting polarizing plate. On the other hand, if the thickness (T2) of the transparent protective film is more than 35 μm or if the ratio (T2/T1) is less than 0.8, it will be difficult to meet the demand for a reduction in thickness in mobile applications and so on. The total thickness of the resulting polarizing plate is preferably from 50 to 105 μm, more preferably from 55 to 100 μm in terms of satisfying the demand for a reduction in thickness and the handleability requirement, while it should be selected depending on the ratio (T2/T1).

In an embodiment of the present invention, the transparent protective film containing the lactone ring structure-containing (meth)acrylic resin is generally obtained by melting and extruding the lactone ring structure-containing (meth)acrylic resin into a film. The resulting film may be stretched so that the strength of the film can be increased.

An unstretched transparent protective film containing the lactone ring structure-containing (meth)acrylic resin has no retardation, but stretching imparts it to a certain retardation. Therefore, a certain resin belonging to the above additional thermoplastic resin and capable of functioning as a retardation-reducing agent may be added to prevent the film from having retardation. Such a retardation-reducing agent may be a styrene-acrylonitrile copolymer or the like. The retardation value may be controlled by the stretch ratio or the amount of the addition of the retardation-reducing agent.

Retardation of the transparent protective film to be used is not limited, but the transparent protective film generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, a retardation plate having an in-plane retardation of 40 nm or more and/or a thickness direction retardation of 80 nm or more may be used as the transparent protective film in an embodiment of the invention. The in-plane retardation is generally controlled to be in the range of 40 to 200 nm, and the thickness direction retardation is generally controlled to be in the range of 80 to 300 nm. When a retardation plate is used as the transparent protective film, the retardation plate also has the function of the transparent protective film, which contributes to a reduction in thickness.

In an embodiment of the invention, the transparent protective film is produced with a lactone ring structure-containing (meth)acrylic resin and has a thickness as defined above and therefore can have a water-vapor permeability of 250 g/m² or less, which is preferred in view of durability. The water-vapor permeability is more preferably 200 g/m² or less.

The transparent protective film for use in an embodiment of the present invention may also contain any one or more appropriate additives. Examples of such other additives include an antioxidant such as a hindered phenol-based, phosphorous-based or sulfur-based antioxidant; a stabilizer such as a light-resistant stabilizer, a weather-resistant stabilizer or a thermal stabilizer; a reinforcing material such as glass fibers or carbon fibers; an ultraviolet absorbing agent such as phenyl salicylate, (2,2'-hydroxy-5-methylphenyl)benzotriazole, or 2-hydroxybenzophenone; a near infrared absorbing agent; a flame retardant such as tris(dibromopropyl)phosphate, triallyl phosphate, or antimony oxide; an antistatic agent such as an anionic, cationic or nonionic surfactant; a colorant such as an inorganic pigment, an organic pigment or a dye; an organic or inorganic filler; a resin modifier; an organic or inorganic filler; a plasticizer; a lubricant; an antistatic agent; and a flame retardant.

In an embodiment of the present invention, the content of the additive in the transparent protective film is preferably from 0 to 5% by weight, more preferably from 0 to 2% by weight, even more preferably from 0 to 0.5% by weight.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic-based and silicone-based resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity including silica, alumina, titania, zirconia, tin oxides, indium oxides, cadmium oxides, antimony oxides, etc., and organic type fine particles including cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

The adhesive layer used to bond the polarizer and the transparent protective film together may be of any of various types such as a water-based type, solvent-based type, hot melt type, or radical-curable type, as long as it is optically transparent. In particular, a water-based adhesive or a radical-curable adhesive is preferred.

Examples of the water-based adhesive used to form the adhesive layer include, but are not limited to, a vinyl polymer-based adhesive, a gelatin-based adhesive, a vinyl-based adhesive, a latex-based adhesive, a polyurethane-based adhesive, an isocyanate-based adhesive, a polyester-based adhesive, and an epoxy-based adhesive. The adhesive layer may be produced from such a water-based adhesive by applying an aqueous solution of the adhesive and drying it. In the preparation of the aqueous solution, if necessary, a crosslinking agent or any other additive and a catalyst such as an acid may also be added. A vinyl polymer-containing adhesive or the like is preferably used as the water-based adhesive, and the vinyl polymer is preferably a polyvinyl alcohol-based resin. The polyvinyl alcohol-based resin may also contain a water-soluble crosslinking agent such as boric acid, borax, glutaraldehyde, melamine, or oxalic acid. Particularly when a polyvinyl alcohol-based polymer film is used to form the polarizer, an adhesive containing polyvinyl alcohol-based resin is preferably used in view of tackiness. An adhesive that contains a polyvinyl alcohol-based resin having an acetoacetyl group is more preferred in order to improve durability.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth)acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 5000, preferably from 1000 to 4000 and an average degree of saponification is from about 85 to about 100 mol %, preferably from 90 to 100 mol % in consideration of adherence.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 1 to 20 mol %, especially preferably from 2 to 7 mol %. If a degree of modification by an acetoacetyl group exceeds 40 mol %, reaction sites with a crosslinking agent is fewer to thereby reduce an effect of improvement on moisture resistance and heat resistance. The degree of modification by an acetoacetyl group is a value determined by NMR.

Any of crosslinking agents that have been used in a polyvinyl alcohol-based adhesive can be used as a crosslinking agent in the present invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane)triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglycidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. In particular, amino-formaldehyde resins and dialdehydes are preferred. Amino-formaldehyde resins preferably include methylol group-containing compounds, and dialdehydes preferably include glyoxal. Methylolmelamine, a methylol group-containing compound, is particularly preferred. The crosslinking agent to be used may be a coupling agent such as a silane coupling agent and a titanium coupling agent.

While the amount of the crosslinking agent to be blended may be appropriately determined depending on the type of the polyvinyl alcohol-based resin and the like, it is generally from about 4 to about 60 parts by weight, preferably from about 10 to about 55 parts by weight, more preferably from 20 to 50 parts by weight, based on 100 parts by weight of the polyvinyl alcohol-based resin. In such ranges, good adhesion properties can be obtained.

In order to increase durability, a polyvinyl alcohol-based resin having an acetoacetyl group is used. Also in this case, the crosslinking agent may be used in an amount of about 4 to about 60 parts by weight, preferably in an amount of about 10 to about 55 parts by weight, more preferably in an amount of 20 to 50 parts by weight, similarly to the above, based on 100 parts by weight of the polyvinyl alcohol-based resin.

If the amount of the crosslinking agent to be blended is too large, the reaction of the crosslinking agent can proceed within a short time so that the adhesive can tend to form a gel, and as a result, the adhesive can have an extremely short pot life and thus can be difficult to use industrially. From these points of view, the crosslinking agent is used in the above amount, but the resin solution according to the present invention can be stably used even when the amount of the crosslinking agent is large as mentioned above, because the resin solution contains the colloidal metal compound.

In an embodiment of the present invention, a resin solution containing a polyvinyl alcohol-based resin, a crosslinking agent and a colloidal metal compound with an average particle size of 1 to 100 nm is preferably used as the adhesive for polarizing plate. The resin solution is generally used in the form of an aqueous solution. The concentration of the resin solution may be, but not limited to, from 0.1 to 15% by weight, preferably from 0.5 to 10% by weight, in view of coatability, storage stability or the like.

The colloidal metal compound is a dispersion of fine particles in a dispersion medium and can have permanent stability, because the fine particles are electrostatically stabilized by the repulsion between the fine particles charged with the same type of charge. The colloidal metal compound (fine particles) has an average particle size of 1 to 100 nm. If the average particle size of the colloid is in this range, the metal compound can be almost uniformly dispersed in the adhesive layer so that knick defects can be prevented, while adhesive properties can be ensured. The average particle size in this range is considerably smaller than the wavelength in the visible light range. Thus, the metal compound has no harmful effect on the polarization properties, even when the transmitted light is scattered by the metal compound in the formed adhesive layer. The average particle size of the colloidal metal compound is preferably from 1 to 100 nm, more preferably from 1 to 50 nm.

The colloidal metal compound to be used may be of various types. Examples of the colloidal metal compound include colloidal metal oxides such as colloidal alumina, colloidal silica, colloidal zirconia, colloidal titania, colloidal tin oxide, colloidal aluminum silicate, colloidal calcium carbonate, and colloidal magnesium silicate; colloidal metal salts such as colloidal zinc carbonate, colloidal barium carbonate and colloidal calcium phosphate; and colloidal minerals such as colloidal celite, colloidal talc, colloidal clay, and colloidal kaolin.

The colloidal metal compound may exist in the form of a colloidal solution, in which the colloidal metal compound is dispersed in a dispersion medium. The dispersion medium is generally water. Besides water, any other dispersion medium such as alcohols may also be used. The concentration of the colloidal metal compound solid in the colloidal solution is generally, but not limited to, from about 1 to about 50% by weight, more generally from 1 to 30% by weight. The colloidal metal compound to be used may contain a stabilizing agent of an acid such as nitric acid, hydrochloric acid and acetic acid.

The colloidal metal compound is electrostatically stabilized and may be classified into a positively charged one and a negatively charged one, while the colloidal metal compound is a non-electrically-conductive material. The positive charge and the negative charge are distinguished depending on the state of the colloidal surface charge in the solution after the preparation of the adhesive. For example, the charge of the colloidal metal compound may be determined by measuring the zeta potential with a zeta potential meter. The surface charge of the colloidal metal compound generally varies with pH. Thus, the charge of the colloidal solution state according to the present invention is influenced by the controlled pH of the adhesive solution. The pH of the adhesive solution is generally set in the range of 2 to 6, preferably in the range of 2.5 to 5, more preferably in the range of 3 to 5, still more preferably in the range of 3.5 to 4.5. In the present invention, the colloidal metal compound having a positive charge is more effective in reducing the occurrence of knick defects than the colloidal metal compound having a negative charge. Examples of the colloidal metal compound having a positive charge include colloidal alumina, colloidal zirconia, colloidal titania, and colloidal tin oxide. In particular, colloidal alumina is preferred.

The colloidal metal compound is added in an amount of 200 parts by weight or less (in solid weight) to 100 parts by weight of the polyvinyl alcohol-based resin. If the amount ratio of the colloidal metal compound is in the above range, the occurrence of knick defects can be reduced, while the adhesion between the polarizer and the transparent protective film can be ensured. The amount ratio of the colloidal metal compound is preferably from 10 to 200 parts by weight, more preferably from 20 to 175 parts by weight, still more preferably from 30 to 150 parts by weight. If the amount ratio of the colloidal metal compound is more than 200 parts by weight based on 100 parts by weight of the polyvinyl alcohol-based resin, the content of the polyvinyl alcohol-based resin in the adhesive can be reduced to a low level, which is undesirable in view of adhesion properties. While there is no particular limitation to the lower limit to the amount ratio of the colloidal metal compound, the lower limit is preferably in the above range for effective prevention of knick defects.

The viscosity of the resin solution, which is used as the adhesive for polarizing plate, is generally, but not limited to, from 1 to 50 mPa·s. In the preparation of conventional polarizing plates, the occurrence of knick defects tends to increase as the viscosity of a resin solution decreases. Using the adhesive for polarizing plate of the present invention, however, the occurrence of knick defects can be prevented even in a low viscosity range such as the range of 1 to 20 mPa·s, and thus the occurrence of knick defects can be prevented regardless of the viscosity of the resin solution. Polyvinyl alcohol-based resin having an acetoacetyl groups cannot have high degree of polymerization in contrast to other general polyvinyl alcohol-based resins, and therefore they are used at a low viscosity as mentioned above. According to the present invention, however, knick defects, which would otherwise be caused by the low viscosity of the resin solution, can be prevented from occurring even when the polyvinyl alcohol-based resin having an acetoacetyl group is being used.

The resin solution for use as the adhesive for polarizing plate may be prepared by any method. In general, the resin solution may be prepared by a process that includes mixing the polyvinyl alcohol-based resin and the crosslinking agent, appropriately adjusting the concentration thereof, and then adding the colloidal metal compound to the mixture. Optionally, a polyvinyl alcohol-based resin having an acetoacetyl group may be used as the polyvinyl alcohol-based resin. When the crosslinking agent is added in a relatively large amount, the stability of the solution may be taken into account, and therefore the mixing of the polyvinyl alcohol-based resin and the colloidal metal compound may be followed by the addition of the crosslinking agent in consideration of the timing of using the resulting resin solution and so on. The concentration of the resin solution for use as the adhesive for polarizing plate may be adjusted as appropriate, after the resin solution is prepared.

Examples of the radical-curable adhesive include various types such as an active energy ray-curable type such as an electron beam-curable type or an ultraviolet-curable type, and a thermosetting type. An active energy ray-curable type is preferred, because it is curable in a short time. An electron beam-curable type is particularly preferred, and an electron beam-curable adhesive may be used. The use of an electron beam in the process of curing the adhesive used for bonding the polarizer to the transparent protective film (specifically dry lamination) can eliminate a heating process, which would otherwise be necessary for an ultraviolet-ray curing method, and thus can provide very high productivity.

Examples of curable components include (meth)acryloyl group-containing compounds and vinyl group-containing compounds. Any of these curable components may be monofunctional, bifunctional or polyfunctional. These curable components may be used alone or in combination of two or more thereof. Preferred examples of the curable components include (meth)acryloyl group-containing compounds such as various types of epoxy(meth)acrylates, urethane(meth)acrylates, polyester(meth)acrylates, and various types of (meth)acrylate monomers.

When the curable component used is a (meth)acryloyl group-containing compound, specifically, a monofunctional (meth)acrylate having an aromatic ring and a hydroxyl group, a nitrogen-containing (meth)acrylate, or a carboxyl group-containing (meth)acrylate, the curable component is suitable for an electron beam-curable adhesive. When such an adhesive is used, a polarizing plate in which the polarizer and the transparent protective film are well bonded together can be obtained. Electron beam-curable adhesives can also exhibit good adhesion to both a low-moisture-content polarizer and a transparent protective film produced with a low-moisture-permeability material so that the resulting polarizing plate can have a high level of dimensional stability.

The use of the curable component described above allows the production of polarizing plates whose dimensions are less changeable and thus can facilitate upsizing of polarizing plates and keep the manufacturing cost low in terms of yield and the number of available pieces. The polarizing plate obtained in the present invention has a high level of dimensional stability and thus can reduce unevenness caused by external heat from a backlight in an image display.

A variety of monofunctional (meth)acrylates each having an aromatic ring and a hydroxy group may be used. The hydroxy group may be present as a substituent on the aromatic ring, but in the present invention, it is preferred that the hydroxy group is present on an organic group (bonded to a hydrocarbon group, specifically bonded to an alkylene group) linking the aromatic ring and (meth)acrylate.

The monofunctional (meth)acrylate having an aromatic ring and a hydroxy group may be a reaction product of a monofunctional epoxy compound having an aromatic ring with (meth)acrylic acid. Examples of the monofunctional epoxy compound having an aromatic ring include phenyl glycidyl ether, tert-butyl phenyl glycidyl ether, and phenyl polyethylene glycol glycidyl ether. Examples of the monofunctional (meth)acrylate having an aromatic ring and a hydroxy group include 2-hydroxy-3-phenoxypropyl(meth)acrylate, 2-hydroxy-3-tert-butylphenoxypropyl(meth)acrylate, and 2-hydroxy-3-phenyl polyethylene glycol propyl (meth)acrylate.

Examples of the nitrogen-containing monomer include N-acryloyl morpholine, N-acryloyl piperidine, N-methacryloyl piperidine, N-acryloyl pyrrolidine, and any other heterocyclic ring-containing acrylic monomer having a heterocyclic ring such as a morpholine ring, a piperidine ring, a pyrrolidine ring, or a piperazine ring. Examples of the nitrogen-containing monomer also include maleimide, N-cyclohexylmaleimide, N-phenylmaleimide; an (N-substituted) amide monomer such as (meth)acrylamide, N,N-dimethyl (meth)acrylamide, N,N-diethyl(meth)acrylamide, N-hexyl (meth)acrylamide, N-methyl(meth)acrylamide, N-butyl (meth)acrylamide, N-butyl(meth)acrylamide, N-methylol (meth)acrylamide, N-methylolpropane(meth)acrylamide, N-isopropylacrylamide, N-methylol(meth)acrylamide, N-hydroxyethyl(meth)acrylamide, or N-methylol-N-propane(meth)acrylamide; an alkylaminoalkyl(meth)acrylate monomer such as aminoethyl(meth)acrylate, aminopropyl(meth)acrylate, N,N-dimethylaminoethyl(meth)acrylate, tert-butylaminoethyl(meth)acrylate, or 3-(3-pyridinyl)propyl (meth)acrylate; and a succinimide monomer such as N-(meth)acryloyloxymethylenesuccinimide, N-(meth)acryloyl-6-oxyhexamethylenesuccinimide, or N-(meth)acryloyl-8-oxyoctamethylenesuccinimide. For example, the nitrogen-containing monomer is preferably a heterocyclic ring-containing acrylic monomer, in particular, N-acryloyl morpholine.

Examples of the carboxyl group-containing monomer include (meth)acrylic acid, carboxyethyl(meth)acrylate, and carboxypentyl(meth)acrylate. In particular, acrylic acid is preferred.

Besides the above, other examples of the (meth)acryloyl group-containing compound include alkyl(meth)acrylate having 1 to 12 carbon atoms such as such as methyl(meth) acrylate, ethyl(meth)acrylate, n-butyl(meth)acrylate, 2-ethylhexyl (meth)acrylate, isooctyl(meth)acrylate, isononyl (meth)acrylate, and lauryl(meth)acrylate; alkoxyalkyl(meth) acrylate monomers such as methoxyethyl(meth)acrylate and ethoxyethyl(meth)acrylate; hydroxyl group-containing monomers such as 2-hydroxyethyl (meth)acrylate, 2-hydroxypropyl(meth)acrylate, 4-hydroxybutyl (meth)acrylate, 6-hydroxyhexyl(meth)acrylate, 8-hydroxyoctyl(meth)acrylate, 10-hydroxydecyl (meth)acrylate, 12-hydroxylauryl (meth)acrylate, and (4-hydroxymethylcyclohexyl)methyl acrylate; acid anhydride group-containing monomers such as maleic anhydride and itaconic anhydride; caprolactone adducts of acrylic acid; sulfonate group-containing monomers such as styrenesulfonic acid, allylsulfonic acid, 2-(meth)acrylamido-2-methylpropanesulfonic acid, (meth) acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate.

The monofunctional (meth)acrylate having an aromatic ring and a hydroxyl group, the nitrogen-containing monomer, or the carboxyl group-containing monomer can be preferably used as the curable component. Any of these curable components preferably have a content of 50% by weight or more in order that a polarizing plate having an adhesive layer with good adhesion to the polarizer and the transparent protective film may be obtained. Such content is also preferred in view of coatability, workability or the like. The content of the curable component is preferably 60% by weight or more, more preferably 70% by weight or more, even more preferably 80% by weight or more.

The curable component to be used may be a bifunctional or polyfunctional curable component. The bifunctional or polyfunctional curable component is preferably bifunctional or polyfunctional (meth)acrylate, particularly preferably bifunctional or polyfunctional epoxy(meth)acrylate. Such bifunctional or polyfunctional epoxy(meth)acrylate may be obtained by a reaction between a polyfunctional epoxy compound and (meth)acrylic acid. Various polyfunctional epoxy compounds may be listed such as aromatic epoxy resins, alicyclic epoxy resins, and aliphatic epoxy resins.

Examples of aromatic epoxy resins include bisphenol epoxy resins such as bisphenol A diglycidyl ether, bisphenol F diglycidyl ether, and bisphenol S diglycidyl ether; novolac epoxy resins such as phenol novolac epoxy resins, cresol novolac epoxy resins, and hydroxybenzaldehyde phenol novolac epoxy resins; and polyfunctional epoxy resins such as glycidyl ether of tetrahydroxyphenylmethane, glycidyl ether of tetrahydroxybenzophenone, and epoxidized polyvinyl phenol.

Examples of alicyclic epoxy resins include hydrogenated products of the above aromatic epoxy resins, cyclohexane type epoxy resins, cyclohexyl methyl ester type epoxy resins, cyclohexyl methyl ether type epoxy resins, spiro type epoxy resins, and tricyclodecane type epoxy resins.

Examples of aliphatic epoxy resins include polyglycidyl ethers of aliphatic polyhydric alcohols or alkylene oxide adducts thereof. Examples thereof include diglycidyl ether of 1,4-butanediol, diglycidyl ether of 1,6-hexanediol, glycerol triglycidyl ether, triglycidyl ether of trimethylolpropane, diglycidyl ether of polyethylene glycol, diglycidyl ether of propylene glycol, and polyglycidyl ethers of polyether polyol produced by adding one or two or more alkylene oxides (such as ethylene oxide and propylene oxide) to an aliphatic polyhydric alcohol such as ethylene glycol, propylene glycol, and glycerin.

The epoxy resin generally has an epoxy equivalent of 30 to 3000 g/equivalent, preferably of 50 to 1500 g/equivalent.

The bifunctional or polyfunctional epoxy(meth)acrylate is preferably epoxy (meth)acrylate of an aliphatic epoxy resin, particularly preferably epoxy(meth)acrylate of a bifunctional aliphatic epoxy resin.

Among the curable components, the (meth)acryloyl group-containing compounds, specifically, the monofunctional (meth)acrylate having an aromatic ring and a hydroxyl group, the nitrogen-containing (meth)acrylate, or the carboxyl group-containing (meth)acrylate is suitable for an electron beam-curable adhesive. When such an adhesive is used, a polarizing plate can be obtained in which good adhesion to the polarizer and the transparent protective film is achieved. For example, when a polarizer with low water content is used and when a transparent protective film with low water-vapor permeability is used, the adhesive according to the present invention shows good adhesion to these films and therefore can form a polarizing plate with high dimensional stability.

The curable type adhesive may also contain a radical initiator in addition to the curable component, depending on the type of curing. When the adhesive to be used is of an electron beam curing-type, it is not always necessary to add a radical initiator to the adhesive. On the other hand, when the adhesive to be used is of an ultraviolet-ray curing-type or a thermosetting type, a radical initiator is used. The radical initiator is generally used in an amount of about 0.1 to about 10 parts by weight, preferably of 0.5 to 3 parts by weight, based on 100 parts by weight of the curable component.

The adhesive may also contain a metal compound filler. When a metal compound filler is used, the fluidity of the adhesive layer can be controlled so that the thickness of the layer can be stabilized, which makes it possible to obtain a polarizing plate with good appearance and in-plane uniformity and without variations in tackiness.

Various types of metal compound fillers may be used. Examples of the metal compound include a metal oxide such as alumina, silica, zirconia, titania, aluminum silicate, calcium carbonate, or magnesium silicate; a metal salt such as zinc carbonate, barium carbonate, or calcium phosphate; and a mineral such as celite, talc, clay, or kaolin. These metal compound fillers may be subjected to surface modification before use.

The average particle size of the metal compound filler is generally from about 1 to about 1,000 nm, preferably from 10 to 200 nm, more preferably from 10 to 100 nm. When the average particle size of the metal compound filler is in the above range, the metal compound can be substantially uniformly dispersed in the adhesive layer, which makes it possible to ensure tackiness and to obtain good appearance and uniform in-plane tackiness.

The metal compound filler is preferably added in an amount of 200 parts by weight or less, based on 100 parts by weight of the curable component. When the content of the metal compound filler is in the above range, good appearance and uniform in-plane tackiness can be obtained together with reliable adhesion to the polarizer and the transparent protective film. The content of the metal compound filler is preferably from 1 to 100 parts by weight, more preferably from 2 to 50 parts by weight, even more preferably from 5 to 30 parts by weight. If the content of the metal compound filler is more than 100 parts by weight based on 100 parts by weight of the curable component, the content of the curable component in the adhesive may be undesirably low in view of tackiness. The content of the metal compound filler is preferably, but not limited to, a lower limit of the value in the above range, in order that good appearance and uniform in-plane tackiness may be obtained together with reliable adhesion.

The adhesive for polarizing plate may also contain any of various tackifiers, ultraviolet absorbing agents, antioxidants, heat-resistant stabilizers, plasticizers, leveling agents, antiforming agents, antistatic agents, and stabilizers such as antihydrolysis stabilizers. In an embodiment of the present invention, the colloidal metal compound or the metal compound filler should be a non-electrically-conductive material, but fine particles of an electrically-conductive material may also be added. Besides, examples of the additive include sensitizers for increasing the electron beam-curing rate or sensitivity, such as carbonyl compounds, coupling agents such as silane coupling agent, titanium coupling agents and adhesion promoters such as ethylene oxide, additives for improving wettability with the transparent protective film, acryloxy group-containing compounds or hydrocarbons (natural or synthetic resins).

The polarizing plate is obtained by bonding the transparent protective films to both sides of the polarizer with an adhesive layer interposed between the polarizer and each transparent protective film. Optionally, an undercoat layer, an adhesion facilitating layer, or the like may be provided between the adhesive layer and the transparent protective film or the polarizer. Examples of adhesion facilitating treatments include: thy treatments such as a plasma treatment and a corona treatment; chemical treatment such as alkaline treatment (saponification); and a coating treatment in which an adhesion facilitating layer is formed. Among them, preferable are a coating treatment and an alkaline treatment each forming an adhesion facilitating layer. In formation of an adhesion facilitating layer, there can be used each of various kinds of adhesion facilitating materials such as a polyol resin, a polycarboxylic resin, a polyester resin and a silicone resin. Note that a thickness of an adhesion facilitating layer is preferably usually from about 0.001 to about 10 μm, more preferably from about 0.001 to about 5 μm and especially preferably from about 0.001 to about 1 μm.

When a water-based adhesive or the like is used to form the adhesive layer, the adhesive layer may have a thickness of about 10 to about 300 nm. The thickness of the adhesive layer is more preferably from 10 to 200 nm, still more preferably from 20 to 150 nm, in terms of achieving uniform in-plane thickness and sufficient adhesive force. At described above, the thickness of the adhesive layer is preferably designed to be larger than the average particle size of the colloidal metal compound contained in the adhesive for polarizing plate.

Examples of methods for controlling the thickness of the adhesive layer include, but are not limited to, methods including controlling the solid concentration of the adhesive solution or controlling an adhesive coater. While the thickness of the adhesive layer may be measured by any method, cross-sectional observation measurement by SEM (Scanning Electron Microscopy) or TEM (Transmission Electron Microscopy) is preferably used. The adhesive may be applied by any process, and various methods such as roll methods, spraying methods, and immersion methods may be used for the application.

After the adhesive is coated, the transparent protective is adhered to the polarizer with a roll laminator or the like. The adhesive may be applied to any one or both of the transparent protective film and the polarizer. After adhesion, a drying step is performed to thereby form an adhesive layer that is a dry coated layer. A drying temperature is from about 5 to about 150° C., preferably from 30 to 120° C. and for a time of 120 sec or longer, preferably for a time 300 sec or longer.

When a curable type adhesive (electron beam-curable adhesive) is used to form the adhesive layer, on the other hand, the adhesive layer preferably has a thickness of 0.1 to 20 μm, more preferably 0.2 to 10 μm, even more preferably 0.3 to 8 μm. If the adhesive layer is too thin, the cohesive strength for the adhesion may be lost, so that the adhesive strength may be lost. If the thickness of the adhesive layer is more than 20 μm, the cost may increase, and the adhesive itself may have a curing shrinkage effect, which may have an adverse effect on the optical properties of the polarizing plate.

After the polarizer and the transparent protective film are laminated, the adhesive is cured by the irradiation of an electron beam or the like. The electron beam may be applied in any appropriate direction. The electron beam is preferably applied from the transparent protective film side. There is a possibility that the application of the electron beam from the polarizer side could lead to degradation of the polarizer.

Any appropriate conditions under which the adhesive can be cured may be used for the irradiation of an electron beam. For example, an electron beam is preferably irradiated at an accelerating voltage of 5 kV to 300 kV, more preferably of 10 kV to 250 kV. If the accelerating voltage is less than 5 kV, the electron beam can fail to reach the adhesive so that the curing can be insufficient. If the accelerating voltage is more than 300 kV, the degree of penetration through the object can be too high so that the electron beam can be reflected to damage the transparent protective film or the polarizer. The irradiation dose is preferably from 5 to 100 kGy, more preferably from 10 to 75 kGy. If the irradiation dose is less than 5 kGy, the adhesive can be insufficiently cured. An irradiation dose of more than 100 kGy can damage the transparent protective film or the polarizer and cause a reduction in mechanical strength or yellow discoloration so that the desired optical properties cannot be achieved.

The electron beam irradiation is generally performed in an inert gas. If necessary, a small amount of air or oxygen may be introduced under the conditions for the irradiation. Oxygen may be introduced as appropriate depending on the material of the transparent protective film. In such a case, the electron beam initially irradiated to the surface of the transparent protective film is intentionally inhibited by the oxygen so that the transparent protective film can be prevented from being damaged and that the electron beam can be efficiently irradiated only to the adhesive.

When the production method is performed on a continuous line, the line speed is preferably from 1 to 500 m/minute, more preferably from 5 to 300 m/minute, still more preferably from 10 to 100 m/minute, depending on the time of curing of the adhesive. A too low line speed can lead to poor productivity or significant damage to the transparent protective film so that it could be impossible to produce polarizing plates durable to an endurance test. A too high line speed can lead to insufficient curing of the adhesive so that there is a possibility that the desired adhesion can not be obtained.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films including suitable polymers, such as polycarbonates, norbornene type resins, polyvinyl alcohols, polystyrenes, poly methyl methacrylates, polypropylene; polyarylates and polyamides; aligned films including liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic-based polymers; silicone-based polymers; polyesters, polyurethanes, polyamides, polyethers; fluorine-based and rubber-based polymers may be suitably selected as a base polymer. Especially, a pressure-sensitive adhesive such as acrylic-based pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers including other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 40 μm, preferably 5 to 30 μm, and more preferably 10 to 25 μm. When the thickness of a pressure-sensitive adhesive layer is thinner than 1 μm, durability is not good. When the thickness of a pressure-sensitive adhesive layer is thicker than 40 μm, appearance is not good because of floating or peeling tendency generated by foaming or likes.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that are coated, if necessary, with release agents, such as silicone-based, long chain alkyl-based, fluorine-based release agents, and molybdenum sulfide may be used. As a suitable sheet material, plastics films, rubber sheets, papers, cloths, no woven fabrics, nets, foamed sheets and metallic foils or laminated sheets thereof may be used.

An anchor layer may also be provided between the polarizing plate and the pressure-sensitive adhesive layer in order to improve the adhesion therebetween.

Materials that may be used to form the anchor layer preferably include an anchoring agent selected from polyurethane, polyester, and polymers containing an amino group in the molecule, in particular, preferably polymers containing an amino group in the molecule. Polymers containing an amino group in the molecule allow the amino group in the molecule to react with a carboxyl group or the like in the pressure-sensitive adhesive or to make an interaction such as an ionic interaction, so that good adhesion can be ensured.

Examples of polymers containing an amino group in the molecule include polyethyleneimine, polyallylamine, polyvinylamine, polyvinylpyridine, polyvinylpyrrolidine, and a polymer made from an amino group-containing monomer such as dimethylaminoethyl acrylate.

To impart antistatic properties, an antistatic agent may also be added to the anchor layer. Examples of the antistatic agent to impart antistatic properties include an ionic surfactant-based antistatic agent, an antistatic agent based on an electrically-conductive polymer such as polyaniline, polythiophene, polypyrrole, or polyquinoxaline; and an antistatic agent based on a metal oxide such as tin oxide, antimony oxide or indium oxide. In particular, an electrically-conductive-polymer-based antistatic agent is preferably used in view of optical properties, appearance, antistatic effect, and antistatic effect stability during heating or humidifying. In particular, a water-soluble or water-dispersible electrically-conductive polymer such as polyaniline or polythiophene is preferably used. When a water-soluble or water-dispersible electrically-conductive polymer is used as an antistatic layer-forming material, organic solvent-induced degradation of the optical film base material can be prevented in the coating process.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester-based compounds, benzophenol-based compounds, benzotriazol-based compounds, cyano acrylate-based compounds, and nickel complex salt-based compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, STN type, π type, VA type and IPS type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer including triphenylamine derivatives etc., a luminescence layer including fluorescent organic solids, such as anthracene; a laminated material of electronic injection layer including such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of a construction and effect of the present invention with examples and the like showing them below. Note that in the examples, part or parts and % are based on weight unless otherwise specified.
(Measurement of Retardation)
The refractive indices nx, ny and nz of the transparent protective film were measured at a wavelength of 590 nm with an automatic birefringence analyzer (Automatic Birefringence Meter KOBRA-21ADH, manufactured by Oji Scientific Instruments) based on the parallel Nicol rotation method and used to calculate the in-plane retardation Re and thickness direction retardation Rth.
(Water-Vapor Permeability)
The water-vapor permeability was measured as the gram weight of water vapor passing through a sample with an area of 1 m$^2$ over 24 hours in an atmosphere at a temperature of 40° C. and a humidity of 92% RH according to the water-vapor permeability test (cup method) of JIS Z 0208.
(Viscosity of Aqueous Adhesive Solution)
The prepared aqueous adhesive solution (room temperature: 23° C.) was measured with a rheometer (RSI-HS, manufactured by Haake).
(Average Particle Size of Colloid)
An aqueous colloidal alumina solution was measured with a particle size distribution meter (Nanotrac UPA150, manufactured by Nikkiso Co., Ltd.) by dynamic light scattering (optical correlation technique).
(Preparation of Polarizer)
A 75 μm-thick, polymer film including polyvinyl alcohol as main component (9P75R (trade name) manufactured by KURARAY CO., LTD., 2,400 in average degree of polymerization, 99.9% by mole in degree of saponification) was uniaxially stretched to 2.5 times using a roll drawing machine, while it was dyed in a dyeing bath containing iodine and potassium iodide and kept at 30±3° C. The polyvinyl alcohol film was then uniaxially stretched to 6 times to the original length, while it was subjected to a crosslinking reaction in an aqueous solution bath containing boric acid and potassium iodide and kept at 60±3° C. The resulting film was dried in an air circulation-type thermostatic oven at 50±1° C. for 30 minutes, so that a polarizer with a moisture content of 26% and a thickness of 27 μm was obtained.
(Transparent Protective Films)
The transparent protective films shown below were used.
Transparent protective film 1: a transparent protective film (0 nm in Re, 0 nm in Rth) produced by extruding a mixture of 90 parts by weight of a lactone ring structure-containing (meth)acrylic resin having the structure represented by formula (1) in which R$^1$ is a hydrogen atom and R$^2$ and R$^3$ are each a methyl group (a copolymer of methyl methacrylate and methyl 2-(hydroxymethyl)acrylate (8:2 in monomer weight ratio), about 100% in degree of lactonization) and 10 parts by weight of an acrylonitrile-styrene (AS) resin (TOYO AS AS20, manufactured by TOYO-STYRENE CO., LTD.) and stretching the extruded material at fixed thickness.

Transparent protective film 2: a 40 μm thick triacetylcellulose film (1 nm in Re, 50 nm in Rth, manufactured by FUJIFILM Corporation).
(Preparation of Adhesive)
At a temperature of 30° C., 100 parts of a polyvinyl alcohol-based resin having an acetoacetyl group (1200 in average degree of polymerization, 98.5% by mole in degree of saponification, 5% by mole in degree of acetoacetylation) and 50 parts of methylolmelamine were dissolved in pure water to form an aqueous solution with a controlled solid concentration of 3.7%. Eighteen parts of an aqueous colloidal alumina solution (15 nm in average particle size, 10% in solid concentration, positively charged) was added to 100 parts of the above aqueous solution to form an aqueous adhesive solution. The aqueous adhesive solution had a viscosity of 9.6 mPa·s and a pH in the range of 4 to 4.5. This is named "adhesive 1." Another aqueous adhesive solution was prepared using the process of preparing adhesive 1, except that the aqueous alumina colloid solution was not added. The resulting aqueous adhesive solution had a viscosity of 7.0 mPa·s and a pH in the range of 4 to 4.5. This is named "adhesive 2."

Example 1

(Preparation of Polarizing Plate)
Adhesive 1 was applied to one side of transparent protective film 1 (35 μm thick) so that the adhesive layer could have a thickness of 80 nm after drying. The adhesive was applied at a temperature of 23° C. 30 minutes after the preparation of the adhesive. The two adhesive-carrying transparent protective films 1 were bonded to both sides of the polarizer at a temperature of 23° C. with a roller and then dried at 55° C. for 6 minutes, so that a polarizing plate was obtained. The ratio (T2/T1)=(27/35)=0.8.

Example 2 to 5 and Comparative Examples 1 to 3

Polarizing plates were prepared as in Example 1, except that the type of the transparent protective film, the thickness or the type of the adhesive was changed as shown in Table 1. Table 1 also shows the water-vapor permeability of each transparent protective film, the total thickness of each polarizing plate, and the ratio (T2/T1) of each polarizing plate.
(Evaluations)
The resulting polarizing plates were evaluated as described below. The results are shown in Table 1.
(Optical Properties: Durability)
Each polarizing plate was stored in an environment of 85° C. and 85% RH for 250 hours. The rate of change in the optical properties (transmittance, degree of polarization, and hue) before and after the storing of the polarizing plate was determined. The results were evaluated according to the criteria below.
○: Cases where the rate of change in the optical property is less than 3%.
Δ: Cases where the rate of change in the optical property is from 3 to 10%.
×: Cases where the rate of change in the optical property is more than 10%.
(Measurement of Transmittance and Degree of Polarization)
The optical properties of the polarizing plate were measured with an integrating sphere-equipped spectrophotometer (V7100 manufactured by JASCO Corporation). In the measurement of the transmittance for each linearly polarized light, the transmittance for completely polarized light obtained through a Glan-Taylor prism polarizer was normalized as 100%. The single-piece transmittance, parallel transmittance ($H_0$) and crossed transmittance ($H_{90}$) were measured at a wavelength of 550 nm, and the degree of polarization was determined from these values according to the formula below. These transmittances were Y values which had undergone luminosity correction in the two-degree visual field (C illuminant) according to JIS Z 8701. Degree of polarization (%)=$\{(H_0-H_{90})/(H_0+H_{90})\}^{1/2} \times 100$.

(Hue)

The polarizing plate was cut into a square test piece (5 cm×5 cm). The single hue value b of the test piece was measured using a spectrophotometer (integrating sphere-type transmittance meter) (DOT-3 (product name) manufactured by MURAKAMI COLOR RESEARCH LABORATORY).

(Handleability)

The handleability was evaluated according to the criteria below.

◯: When the polarizing plate is held horizontally by supporting its ends, it bends but does not break.

Δ: When the polarizing plate is held horizontally by supporting its ends, the supported end portions are cracked.

×: During the process of manufacturing the polarizing plate, the transparent protective film is wrinkled or broken.

(Adhesion)

At an end of the polarizing plate, the cutting edge of a cutter was inserted between the polarizer and the transparent protective film. At the insertion site, the polarizer and the transparent protective film were held and pulled in opposite directions, respectively. At that time, when the polarizer and/or the transparent protective film was broken so that they could not be separated from each other, their adhesion was determined as good (marked by "◯"). In contrast, when the polarizer and the transparent protective film were partially or entirely separated from each other, their adhesion was determined as poor (marked by "×").

(Amount of Peeling)

The polarizing plate was cut 50 mm long in the direction of the absorption axis of the polarizer and 25 mm long in the direction perpendicular to the absorption axis so that a sample was prepared. While the sample was immersed in hot water at 60° C., the amount (mm) of the peeling edge of the sample was measured over time. The amount (mm) of the peeling was measured with a vernier caliper. The amount (mm) of the peeling after 5 hours is shown in Table 1.

(Appearance Evaluation: Knick Defects)

The polarizing plate was cut in a size of 1000 mm×1000 mm to form a sample. The polarizing plate sample was placed under a fluorescent lamp. Another polarizing plate was placed on the light source side of the polarizing plate sample such that their absorption axes were perpendicular to each other, and in this configuration, light leakage portions (knick defects) were counted.

TABLE 1

| | Thickness T2 (μm) of polarizer | Transparent protective film Type | Thickness T1 (μm) | Water-vapor permeability (g/m²) | Adhesive type | Total thickness (μm) of polarizing plate | T2/T1 |
|---|---|---|---|---|---|---|---|
| Example 1 | 27 | Transparent protective film 1 | 35 | 90 | Adhesive 1 | 97 | 0.8 |
| Example 2 | 27 | Transparent protective film 1 | 30 | 100 | Adhesive 1 | 87 | 0.9 |
| Example 3 | 27 | Transparent protective film 1 | 20 | 170 | Adhesive 1 | 67 | 1.35 |
| Example 4 | 27 | Transparent protective film 1 | 15 | 190 | Adhesive 1 | 57 | 1.8 |
| Example 5 | 27 | Transparent protective film 1 | 20 | 170 | Adhesive 2 | 67 | 1.35 |
| Comparative Example 1 | 27 | Transparent protective film 1 | 10 | 240 | Adhesive 1 | 47 | 2.7 |
| Comparative Example 2 | 27 | Transparent protective film 2 | 40 | 800 | Adhesive 1 | 107 | 0.7 |
| Comparative Example 3 | 27 | Transparent protective film 1 | 40 | 80 | Adhesive 1 | 107 | 0.7 |

| | Evaluations | | | | | | |
|---|---|---|---|---|---|---|---|
| | Optical properties | | | | | Amount of peeling (mm) | Knick defects (counts) |
| | Transmittance | Degree of polarization | Hue | Handleability | Adhesion | | |
| Example 1 | ◯ | ◯ | ◯ | ◯ | ◯ | 0 | 0 |
| Example 2 | ◯ | ◯ | ◯ | ◯ | ◯ | 0 | 0 |
| Example 3 | ◯ | ◯ | ◯ | ◯ | ◯ | 0 | 0 |
| Example 4 | ◯ | ◯ | ◯ | ◯ | ◯ | 0 | 0 |

TABLE 1-continued

| | | | | | | | |
|---|---|---|---|---|---|---|---|
| Example 5 | ○ | ○ | ○ | ○ | ○ | 0 | 23 |
| Comparative Example 1 | Δ | Δ | Δ | Δ | ○ | 0 | 3 |
| Comparative Example 2 | X | X | X | ○ | ○ | 0 | 0 |
| Comparative Example 3 | ○ | ○ | ○ | ○ | ○ | 0 | 0 |

The invention claimed is:

1. A polarizing plate, comprising a polyvinyl alcohol-based polarizer and transparent protective films provided on both sides of the polarizer with an adhesive layer interposed between the polarizer and each transparent protective film,
wherein the transparent protective films each comprise a lactone ring structure-containing (meth)acrylic resin,
wherein each one of the transparent protective films has a thickness T1 (μm) of 10 to 35 μm,
wherein the polarizer has a thickness T2 (μm) which satisfies that the ratio (T2/T1) of T2 to the thickness T1 of each one of the transparent protective films falls within the range of 0.8 to 1.8, and
wherein the adhesive layers are formed from an adhesive comprising a resin solution, wherein the resin solution comprises a polyvinyl alcohol-based resin, a crosslinking agent and a colloidal metal compound with an average particle size of 1 nm to 50 nm, wherein 200 parts by weight or less of the colloidal metal compound is added to 100 parts by weight of the polyvinyl alcohol-based resin.

2. The polarizing plate according to claim 1, wherein the colloidal metal compound is at least one selected from the group consisting of colloidal alumina, colloidal silica, colloidal zirconia, colloidal titania, and colloidal tin oxide.

3. The polarizing plate according to claim 2, wherein the colloidal metal compound has a positive charge.

4. The polarizing plate according to claim 3, wherein the colloidal metal compound is colloidal alumina.

5. The polarizing plate of claim 1, wherein the transparent protective films each have a water-vapor permeability of 250 $g/m^2$ or less.

6. An optical film, comprising a laminate comprising at least one piece of the polarizing plate according to claim 1.

7. An image display, comprising the optical film according to claim 6.

8. An image display, comprising the polarizing plate according to claim 1.

* * * * *